(12) United States Patent
Takeda (10) Patent No.: US 8,428,422 B2
(45) Date of Patent: Apr. 23, 2013

(54) MOVING PICTURE MULTIPLEXING APPARATUS, AUDIO AND VIDEO RECORDING APPARATUS AND MOVING PICTURE MULTIPLEXING METHOD

(75) Inventor: Shinya Takeda, Osaka (JP)

(73) Assignee: Panasonic Corporation, Osaka (JP)

( * ) Notice: Subject to any disclaimer, the term of this patent is extended or adjusted under 35 U.S.C. 154(b) by 302 days.

(21) Appl. No.: 12/975,584

(22) Filed: Dec. 22, 2010

(65) Prior Publication Data
US 2011/0158612 A1 Jun. 30, 2011

(30) Foreign Application Priority Data

Dec. 25, 2009 (JP) ................................. 2009-294164
Nov. 15, 2010 (JP) ................................. 2010-255347

(51) Int. Cl.
*H04N 5/935* (2006.01)
*H04N 5/93* (2006.01)

(52) U.S. Cl.
USPC .......................................... 386/210; 386/286

(58) Field of Classification Search ........................ None
See application file for complete search history.

(56) References Cited

U.S. PATENT DOCUMENTS

| | | | |
|---|---|---|---|
| 6,999,674 B1 | 2/2006 | Hamada et al. | |
| 7,403,698 B2 | 7/2008 | Hamada et al. | |
| 2002/0145702 A1 | 10/2002 | Kato et al. | |
| 2006/0013564 A1 | 1/2006 | Hamada et al. | |
| 2006/0050778 A1 | 3/2006 | Aridome et al. | |
| 2008/0253742 A1 | 10/2008 | Hamada et al. | |
| 2008/0317139 A1 | 12/2008 | Arakawa | |
| 2009/0097821 A1* | 4/2009 | Yahata et al. | 386/95 |
| 2009/0169177 A1* | 7/2009 | Ui | 386/98 |
| 2010/0080534 A1* | 4/2010 | Kato et al. | 386/95 |

FOREIGN PATENT DOCUMENTS

| | | |
|---|---|---|
| JP | 9-284763 | 10/1997 |
| JP | 2000-316158 | 11/2000 |
| JP | 2001-157145 | 6/2001 |
| JP | 2002-158974 | 5/2002 |
| JP | 2005-136633 | 5/2005 |
| JP | 2009-004897 | 1/2009 |

\* cited by examiner

*Primary Examiner* — Gelek W Topgyal
(74) *Attorney, Agent, or Firm* — Wenderoth, Lind & Ponack, L.L.P.

(57) ABSTRACT

The present invention provides a moving picture multiplexing apparatus generating a seamlessly-reproducible multiplexed stream even in the case where streams are reproduced in a different order. The moving picture multiplexing apparatus includes: a stream end information generating unit generating stream end information including a stream end system clock, using a video end PTS; a start clock calculating unit calculating a multiplex starting system clock, using the stream end information as stream end information on a preceding stream, and a video start PTS; an end clock calculating unit calculating a multiplex ending system clock, using the video start PTS as a video start PTS of a following stream, and the stream end information; and a multiplexed pack generating unit generating the multiplexed stream by starting the multiplexing at the multiplex starting system clock, and ending the multiplexing at the multiplex ending system clock.

8 Claims, 8 Drawing Sheets

MOVING PICTURE MULTIPLEXING APPARATUS, AUDIO AND VIDEO RECORDING APPARATUS AND MOVING PICTURE MULTIPLEXING METHOD

BACKGROUND OF THE INVENTION (1) Field of the Invention

The present invention relates to a moving picture multiplexing apparatus which multiplexes coded audio data and video data to generate a seamlessly-reproducible multiplexed stream, an audio and video recording apparatus, and a moving picture multiplexing method.

(2) Description of the Related Art

Recent introduction of high-definition camcorders in increasing numbers has promoted development of Advanced Video Codec High Definition (AVCHD)-compliant camcorders. Such camcorders store in a storage medium a single audio and video stream including the start of recording through the end of recording, as well as an AVCHD-compliant navigation file. By repeating the above storage operations, audio and visual stream files and navigation files corresponding to the audio and visual stream files are stored in the storage media.

Here, the AVCHD-compliant navigation files include the following:

A clip information file in which information on audio and video streams is stored;

A play list file in which information on a reproduction order of the audio and video streams is stored;

An object file in which information on an reproduction order of the play lists is stored; and An index file in which overall information on the storage medium is stored.

In reproducing the audio and video streams in a reproduction order stored in the play list file, the AVCHD standard introduces a technique capable of sequentially and seamlessly reproducing the audio and video streams. Thus, the AVCHD-compliant reproducing devices are designed to seamlessly reproduce audio and video streams designated for seamless reproduction.

In order to seamlessly reproduce the audio and video streams sequentially, however, the following conditions shall be met at once:

<Conditions of Video Coding Information>

The same resolution among the streams;

The same frame rate among the streams;

The same aspect ratio among the streams;

The same number of referable pictures used in motion compensation; and

Compliant with the virtual buffer model, including connection points (No overflow or underflow is developed).

<Conditions of Audio Coding Information>

The same number of channels among the streams;

The same bit rate among the streams;

The same sampling frequency among the streams;

Compliant with the virtual buffer model of the multiplex system, including connection points (No overflow or underflow is developed).

The value of the start Presentation Time Stamp (PTS) of audio should be equal to or smaller than that of the video start PTS.

A time indicating the last PTS of the audio in addition to a time period for one audio frame should be equal to or greater than a time indicating the last PTS of the video in addition to a time period for one video frame.

<Conditions of Stream Multiplexing>

Figure 1:
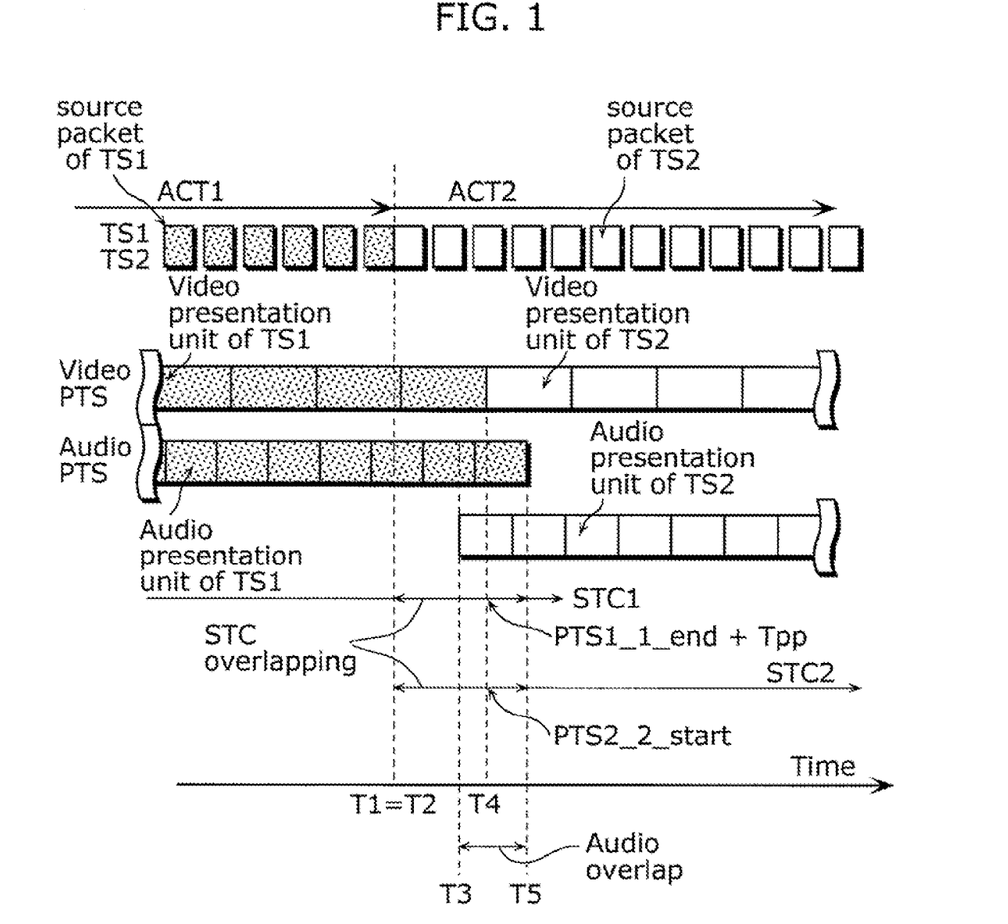
FIG. 1 shows a relationship between a system clock and a PTS assigned to a connecting part found when a preceding stream and a following stream are seamlessly reproduced.

Conditions of multiplexing are shown in FIG. 1. FIG. 1 shows a relationship between a system clock and a PTS. Here, the PTS is assigned to a connecting part found when a preceding stream TS1 and a following stream TS2 are seamlessly reproduced. In the Description, the terms "system clock" and "PTS" are defined in the same meaning level as below. The "system clock", typically used in multiplexing, means "a time at which the audio and video data is multiplexed". The "PTS" means "a time at which video is displayed" or "a time at which audio is delivered".

First, defined as follows are PTSs and system clocks of the preceding stream TS1 (hereinafter referred to as TS1) and the following stream TS2 (hereinafter referred to as TS2):

PTS1_1_end: the last PTS of a video of TS1;

PTS2_2_start: the start PTS of the video of TS2;

Tpp: a time period interval for displaying the last picture included in the video of the TS1;

STC_delta=PTS1_1_end+Tpp−PTS2_2_start: a difference value used for converting the system clock on the TS1 into that on the TS2;

STC2=STC1−STC_delta: an equation converting the clock on TS1 into that on TS2;

STC1_1_end: a system clock value, on TS1, at which the end data of the last packet of TS1 is transmitted;

STC2_2_start: a system clock value, on TS2, at which the start data of the start packet of TS2 is transmitted; and STC2_1_end=STC1_1_end−STC_delta: a value obtained by converting the system clock value at which the end data of the last packet of TS1 into a clock on TS2

In order to reproduce TS1 and TS2 seamlessly, the condition described below shall be met in performing multiplexing.

<Conditions for a Successful Seamless Connection>

STC2_2_start>STC2_1_end

Following the last packet of TS1, the start packet of the TS2 is provided with the system clocks of the TS1 and TS2 unbroken. Then, the system clock, the PTS, and a Decoding Time Stamp (DTS), all of which are assigned to all packets included in TS2, are converted into the system clocks on TS1 in conformity with the system clocks found on the TS1 and having the start packet of TS2. Here, in performing the conversion, the PTSs and the DTSs of the video are to be matched with a predetermined frame rate. The above configuration makes possible seamlessly reproducing TS1 and TS2.

A conventional art has proposed a technique for generating a stream capable of the seamless reproduction (See Patent Reference 1: Japanese Unexpected Patent Application Publication No. 2009-4897). The technique involves generating a seamlessly reproducible stream as follows: upon ending storage of a preceding stream, the technique involves holding information on virtual buffer occupancy and multiplexing of following streams to be successively stored; and upon starting the storage of the following streams, the technique employs the held information to involve adjusting the amount of coded data of the following streams, and timing the multiplexing of the following streams.

The above conventional technique can ensure a seamless connection when reproducing streams in a storing order; however, the conventional technique cannot meet all the conditions for the seamless connection in the case where the streams are reproduced in an order different from the storing order.

Figure 2:
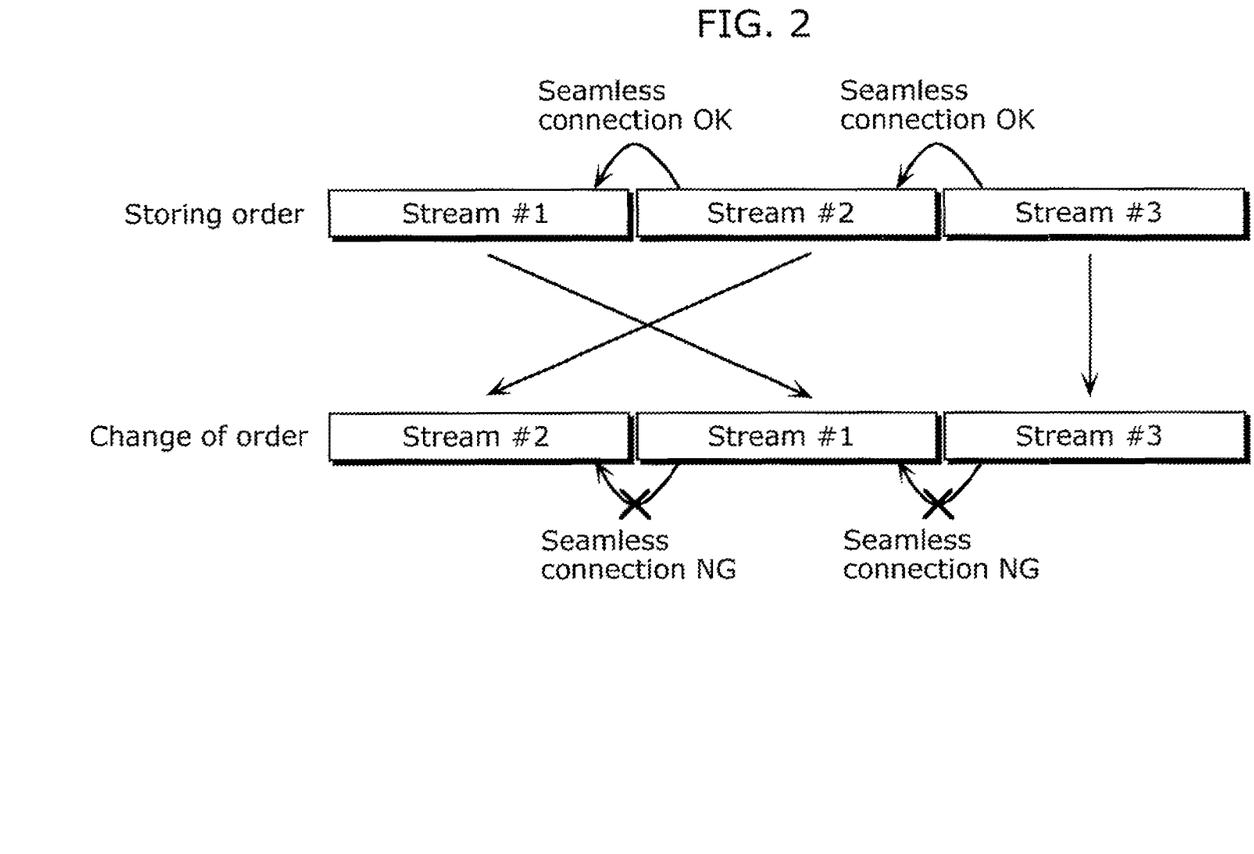
FIG. 2 shows how a conventional technique develops problems when changing a reproduction order of audio and video streams stored by the conventional technique.

FIG. 2 shows how the conventional technique develops problems when changing the reproduction order of audio and video streams stored by the conventional technique.

For example, suppose audio and video streams are obtained by a camcorder, and the streams are stored in a storage medium as shown in FIG. 2. Then, the audio and video streams in the storage medium are loaded on a personal computer (hereinafter referred to as PC), changed in reproduction order, and stored in another storage medium. Here, in some sequential streams, the above conditions for stream multiplexing cannot be met, resulting in possible failure of seamless reproduction of the streams.

In the case where Stream 2 shown in FIG. 2 and found between Streams 1 and 3 is deleted, Streams 1 and 3 might not be seamlessly reproduced as well.

In order to achieve a successful seamless connection after a change of a reproduction order of streams or deleting a stream, the following streams hive to be re-multiplexed so that each following stream can be seamlessly connected to a corresponding preceding stream in a reproduction order. This process causes an increase in processing load. As described above, the conventional technique might develop a possible failure of seamless reproduction when reproducing streams in an order different from the storing order.

The present invention is conceived in view of the above problems and has as an object to introduce a moving picture multiplexing apparatus capable of generating seamlessly-reproducible multiplexed streams even in the case where the streams are reproduced in an order different from an order in which the streams have been stored, an audio and video recording apparatus, and a moving picture multiplexing method.

SUMMARY OF THE INVENTION

In order to solve the above problems, a moving picture multiplexing apparatus according to an aspect of the present invention multiplexes coded audio data and coded video data to generate a multiplexed stream seamlessly reproducible with a preceding stream and a following stream. The moving picture multiplexing apparatus includes: a stream end information generating unit which generates stream end information including a stream end system clock, using a video end Presentation Time Stamp (PTS) which is a PTS assigned to an end of the video data, the stream end system clock indicating a time at which end data of a last packet in the multiplexed stream is transmitted; a start clock calculating unit which calculates a multiplex starting system clock indicating a time at which multiplexing starts, using (i) as stream end information on the preceding stream, the stream end information generated by the stream end information generating unit, and (ii) a video start PTS which is a PTS assigned to a start of the video data; an end clock calculating unit which calculates a multiplex ending system clock indicating a time at which the multiplexing ends, using (i) as a video start PTS of the following stream, the video start PTS and (ii) the stream end information generated by the stream end information generating unit; and a multiplexed pack generating unit which generates the multiplexed stream by (i) starting the multiplexing at the multiplex starting system clock calculated by the start clock calculating unit, and (ii) ending the multiplexing at the multiplex ending system clock calculated by the end clock calculating unit.

As described above, the multiplexed stream is generated by the moving picture multiplexing apparatus according to the aspect of the present invention through the following operations: (i) calculating the multiplex starting system clock, using the stream end information as that of the preceding stream; (ii) calculating the multiplex ending system clock, using the start PTS of video as the start PTS of video in the following stream; and (iii) multiplexing the stream by starting at the multiplex starting system clock and ending at the multiplex ending system clock. In other words, the moving picture multiplexing apparatus can generate a multiplexed stream seamlessly-connectible to a virtually set preceding stream, as well as to a virtually set following stream. Since the moving picture multiplexing apparatus generates all multiplexed streams so that the multiplexed streams are seamlessly connectible to virtually set preceding streams and virtually set following streams. Accordingly, all such multiplexed streams can be seamlessly reproduced in any reproducing order. Hence, the moving picture multiplexing apparatus can generate seamlessly reproducible multiplexed streams when reproducing the multiplexed streams in an order different from the recording order.

Preferably, the start clock calculating unit calculates the multiplex starting system clock, using the stream end information generated by the stream end information generating unit and the video start PTS obtained from the multiplexed pack generating unit, the stream end information being generated according to the video end PTS which has been predetermined. The above structure makes possible calculating a multiplex starting system clock, employing stream end information generated out of video end PTS predetermined by the user and a video start PTS obtained from the multiplexed pack generating unit. Thus, the moving picture multiplexing apparatus can easily obtain the stream end information and the video start PTS to calculate the multiplex starting system clock.

Preferably, the end clock calculating unit calculates the multiplex ending system clock, using the stream end information generated by the stream end information generating unit and the video start PTS, the stream end information being generated according to the video end PTS obtained from the multiplexed pack generating unit.

The above structure makes possible calculating a multiplex ending system clock, employing the stream end information generated out of the video end PTS obtained from the multiplexed pack generating unit and the video start PTS. Thus, the moving picture multiplexing apparatus can easily obtaining the stream end information and the video start PTS to calculate the multiplex ending system clock.

Depending on a difference between a PTS assigned to an end of the audio data and the PTS assigned to the end of the video data, the stream end information generating unit preferably (i) changes the system clock at which the end data of the last packet in the multiplexed stream is transmitted so as to calculate the stream end system clock, and (ii) generates the stream end information including the calculated stream end system clock and the video end PTS.

Taking the difference between the end PTSs of the audio data and the video data into consideration, the above structure makes possible calculating the stream end system clock to generate the stream end information. According to the AVCCD standard, for example, the end PTS of the audio data is behind that of the video data up to a time period for one frame of the audio data. Taking the time period of the audio data for one frame into consideration, the above structure makes possible calculating the stream end system clock to generate seamlessly reproducible multiplexed streams.

Preferably, the stream end information generating unit further includes: an audio frame information calculating unit which calculates audio frame information including a size and a time period of audio data for one frame, using an audio coding parameter including a bit rate and sampling frequency of the audio data; and a stream end system clock calculating unit which calculates the stream end system clock, using the calculated audio frame information, the video end PTS, and an audio virtual buffer model parameter including a packet size, a buffer size, and a leak rate of the audio data.

In addition, the above structure employs an audio coding parameter to calculate audio frame information, and employs the audio frame information, the end PTS of video, and an audio virtual buffer model parameter to calculate the stream end system clock. Here, the audio coding parameter is determined by the characteristics of the moving picture multiplexing apparatus. The video end PTS is a value predetermined by the user. The audio virtual buffer model parameter is determined by an audio and video standard. Thus, the stream end system clock can be easily calculated with those values.

Preferably, the moving picture multiplexing apparatus according to the aspect of the present invention multiplexes the video data and the audio data to generate the multiplexed stream, the video data and the audio data being Advanced Video Codec High Definition (AVCHD)-compliant.

According to the above structure, the moving picture multiplexing apparatus multiplexes AVCHD-compliant audio data and video data to generate multiplexed streams. In the AVCHD standard, the moving picture multiplexing apparatus can generate seamlessly-reproducible multiplexed streams.

Instead of the above moving picture multiplexing apparatus, the present invention may be introduced as an audio and visual recording apparatus including the moving picture multiplexing apparatus and recording multiplexed streams generated by the moving picture multiplexing apparatus. Furthermore, the present invention may be introduced as an integrated circuit equipped with processing units included in the moving picture multiplexing apparatus and the audio and visual recording apparatus, and a moving picture multiplexing method including processes of the processing units as steps. Furthermore, the present invention can be introduced as (i) a program to cause a computer to execute those steps, (ii) a computer-readable storage medium such as a CD-ROM, and (iii) information, data, and a signal indicating the program. Then, the program, the information, the data, and the signal may be distributed via a communications network, such as the Internet.

The moving picture multiplexing apparatus according to an implementation of the present invention can generate seamlessly reproducible multiplexed streams when reproducing the multiplexed streams in an order different from the recording order.

Further Information about Technical Background to this Application

The disclosures of Japanese Patent Application No. 2009-294164 filed on Dec. 25, 2009, and Japanese Patent Application No. 2010-255347 filed on Nov. 15, 2010 both including specification, drawings and claims are incorporated herein by reference in their entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT

Hereinafter, Embodiment in the present invention shall be described with reference to the drawings.

Figure 3:
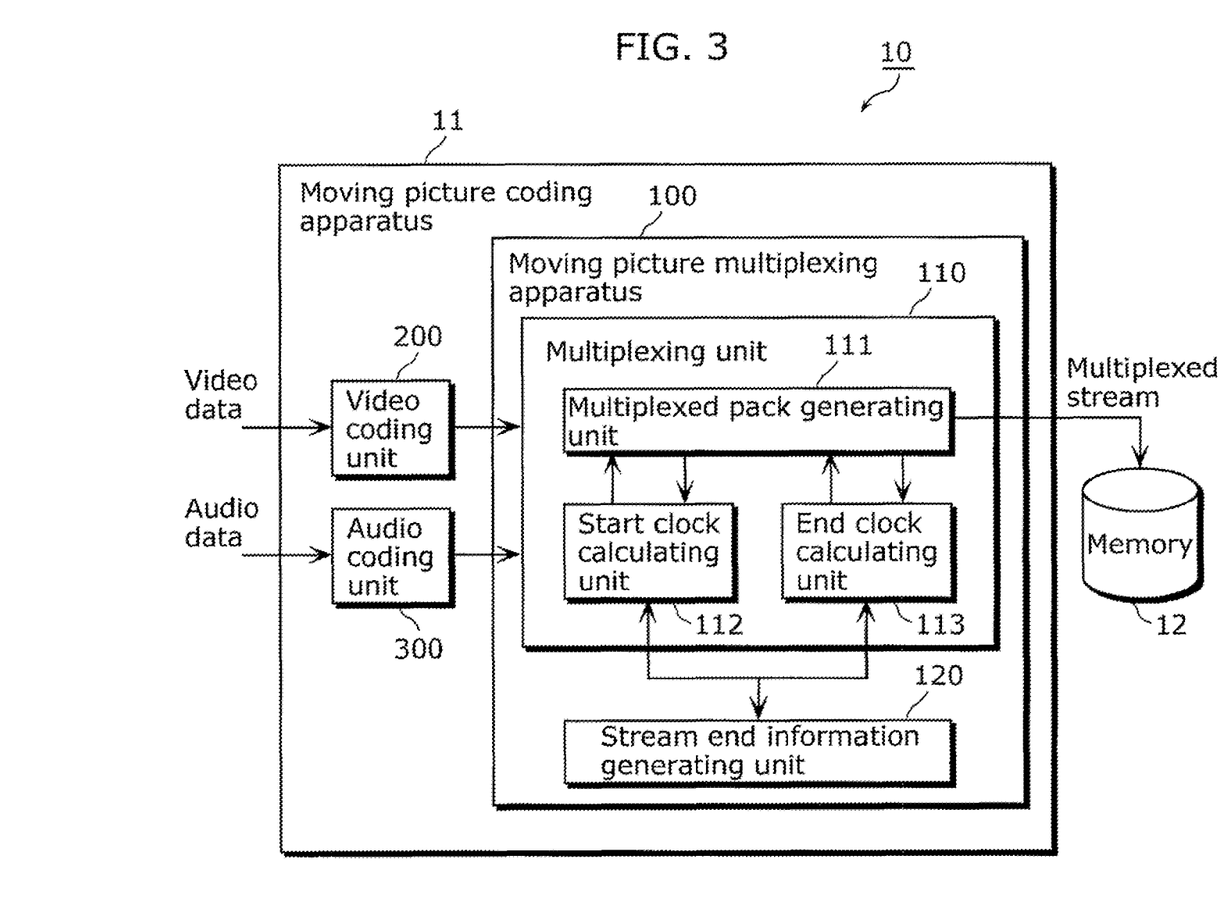
FIG. 3 shows a block diagram illustrating a functional structure of an audio and video recording apparatus including a moving picture multiplexing apparatus according to Embodiment in the present invention.

FIG. 3 shows a block diagram illustrating a functional structure of an audio and video recording apparatus 10 including a moving picture multiplexing apparatus 100 according to Embodiment in the present invention.

The audio and video recording apparatus 10 stores audio data and video data, and is included for example in an imaging apparatus such as an AVCHD-compliant camcorder. As shown in FIG. 3, the audio and video recording apparatus 10 includes a moving picture coding apparatus 11, and a memory 12. Here, the moving picture coding apparatus 11 receives the audio data and the video data, and provides a multiplexed stream. The memory 12 stores provided each multiplexed stream. The moving picture coding apparatus 11 includes the moving picture multiplexing apparatus 100, a video coding unit 200, and an audio coding unit 300.

The video coding unit 200 codes the received video data, and provides the coded video data to the moving picture multiplexing apparatus 100.

The video coding unit 300 codes the received audio data, and provides the coded audio data to the moving picture multiplexing apparatus 100.

The moving picture multiplexing apparatus 100 multiplexes the coded video data and the coded audio data to generate the multiplexed stream seamlessly reproducible with a preceding stream and a following stream. For example, the moving picture multiplexing apparatus 100 multiplexes AVCHD-compliant audio data and video data to generate the multiplexed stream. The moving picture multiplexing apparatus 100 includes a multiplexing unit 110 and a stream end information generating unit 120.

The stream end information generating unit 120 generates stream end information on an end of the multiplexed stream. Details of the stream end information generating unit 120 and the stream end information shall be described later.

The multiplexing unit 110 receives and multiplexes the coded video data and the coded audio data to provide the multiplexed stream. The multiplexing unit 110 includes a multiplexed pack generating unit 111, a start clock calculating unit 112, and an end clock calculating unit 113.

The multiplexed pack generating unit 111 (i) separates each of the received and coded audio data and video data into units of packets, (ii) multiplexes the separated packets, and (iii) provides the multiplexed packets as the multiplexed stream.

Specifically, the multiplexed pack generating unit 111 generates the multiplexed stream by (i) starting the multiplexing at a multiplex starting system clock calculated by the start clock calculating unit 112 and (ii) ending the multiplexing at a multiplex ending system clock calculated by the end clock calculating unit 113.

Here, the start clock calculating unit 112 regards the stream end information generated by the stream end information generating unit 120 as stream end information on a preceding stream. The start clock calculating unit 112 uses the stream end information and a video start PTS to calculate the multiplex starting system clock at which the multiplexing starts. Here, the video start PTS is a PTS assigned to the start of the video data. Specifically, the start clock calculating unit 112 uses the stream end information and the video start PTS to calculate the multiplex starting system clock. Here, the stream end information is associated with a predetermined video end PTS, and generated by the stream end information generating unit 120. The video start PTS is obtained from the multiplexed pack generating unit 111.

In other words, the start clock calculating unit 112 uses the PTS of the start video data and end information on a virtual preceding stream to calculate the multiplex starting system clock, so that a currently multiplexed stream can seamlessly connect to the virtual preceding stream. Here, the PTS of the start video data is provided from the multiplexed pack generating unit 111 when the multiplexing starts. The end information of the virtual preceding stream is obtained from the stream end information generated by the stream end information generating unit 120.

The end clock calculating unit 113 calculates a multiplex ending system clock indicating a time at which the multiplexing ends, using (i) as a video start PTS of the following stream, the video start PTS and (ii) the stream end information generated by the stream end information generating unit 120. Specifically, the end clock calculating unit 113 calculates the multiplex ending system clock, using the stream end information generated by the stream end information generating unit 120 and the video start PTS. In other words, the end clock calculating unit 113 uses a PTS of the last video data and start information of a virtual following stream to calculate the multiplex ending system clock, so that the virtual following stream can seamlessly connect to the currently multiplexed stream. Here, the PTS of the last video data is provided from the multiplexed pack generating unit 111 when the multiplexing ends.

It is noted that the end information of the preceding stream includes the following information:

A PTS of the last video data (above PTS1_1_end);
A time period interval for displaying the last video data (above Tpp); and
A system clock, at which end data of the last packet is transmitted (above STC1_1_end)

The start information of the following stream includes the following information:

A PTS of the start video data (above PTS2_2_start); and
A system clock at which the start data of the start packet is transmitted (above STC2_2_start)

Figure 4:
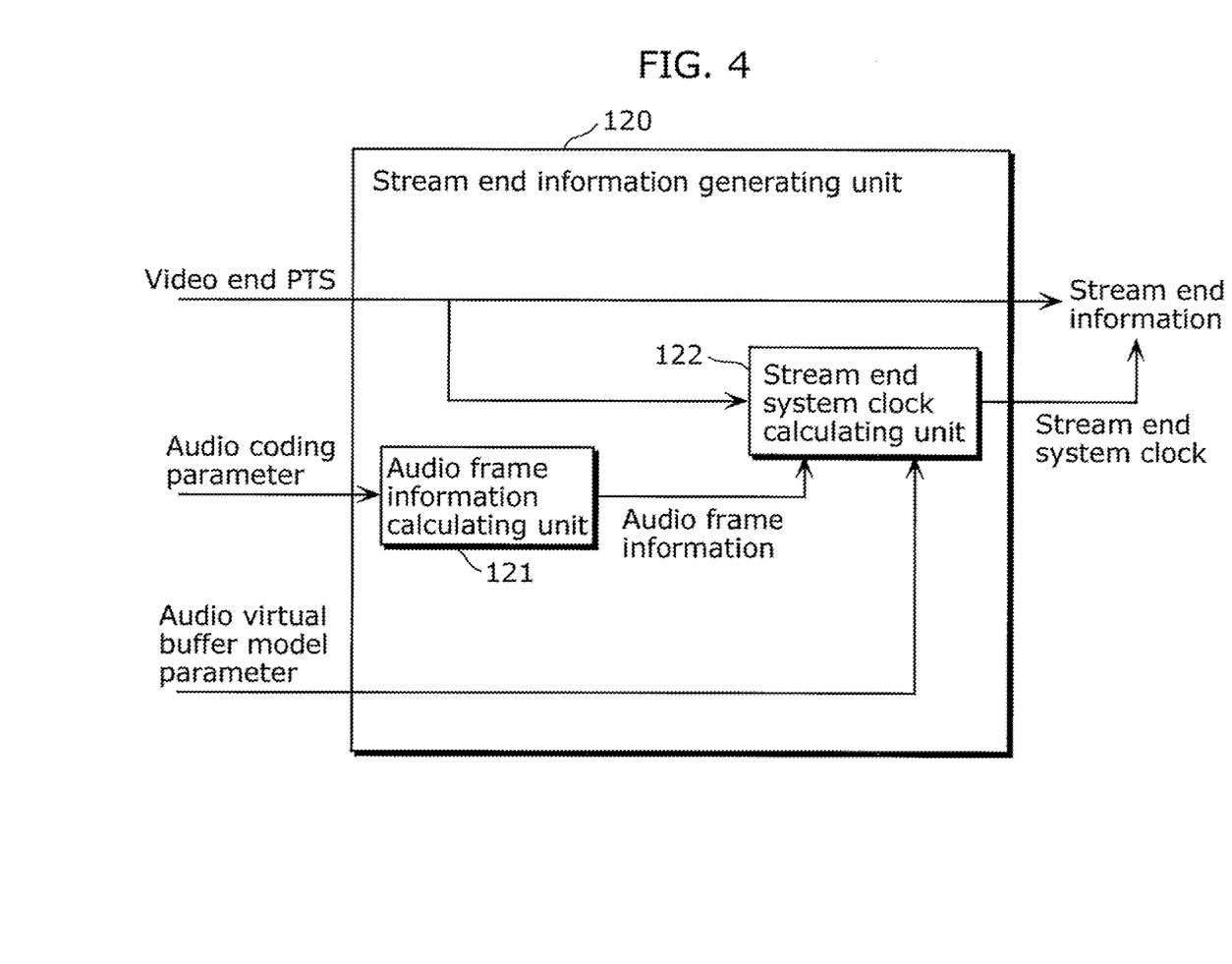
FIG. 4 shows a block diagram illustrating a functional structure of a stream end information generating unit according to Embodiment in the present invention.

Next, details of the stream end information generating unit 120 and the stream end information shall be described hereinafter.

FIG. 4 shows a block diagram illustrating a functional structure of the stream end information generating unit 120 according to Embodiment in the present invention.

The stream end information generating unit 120 generates the stream end information including the stream end system clock, using a video end Presentation Time Stamp (PTS) which is a PTS assigned to an end of the video data, the stream end system clock which indicates a time at which end data of a last packet in the multiplexed stream is transmitted. Depending on the difference between the end PTS of the audio data and the end PTS of the video data, specifically, the stream end information generating unit 120 changes the system clock at which the end data of the last packet in the multiplexed stream is transmitted to calculate the stream end system clock. Then, the stream end information generating unit 120 generates the stream end information including the calculated stream end system clock and the video end PTS. Here, the stream end information generating unit 120 includes an audio frame information calculating unit 121 and a stream end system clock calculating unit 122.

The audio frame information calculating unit 121 calculates audio frame information including a size and a time period of audio data for one frame, using an audio coding parameter including a bit rate and sampling frequency of the audio data.

The stream end system clock calculating unit 122 calculates the stream end system clock, using the audio frame information calculated by the audio frame information calculating unit 121, the video end PTS, and an audio virtual buffer model parameter including a packet size, a buffer size, and a leak rate of the audio data. Here, the audio virtual buffer model parameter indicates the packet size, the buffer size, and the leak rate of the audio data.

Figure 5:
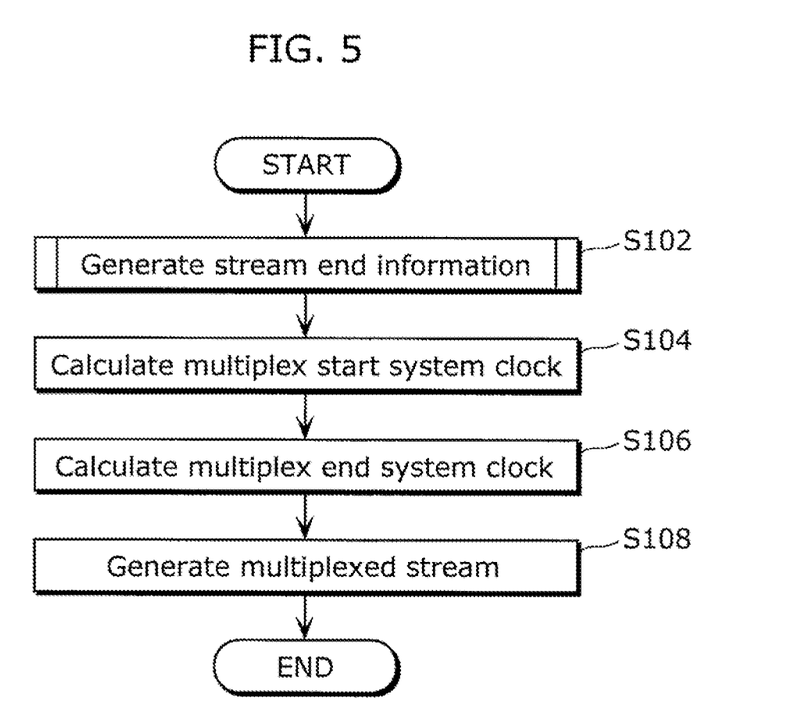
FIG. 5 is a flowchart exemplifying an operation of the moving picture multiplexing apparatus according to Embodiment in the present invention.

Detailed next is how the moving picture multiplexing apparatus 100 generates the multiplexed stream.

FIG. 5 is a flowchart exemplifying an operation of the moving picture multiplexing apparatus 100 according to Embodiment in the present invention.

As shown in FIG. 5, first, the stream end information generating unit 120 generates the stream end information (S102). Details of how the stream end information generating unit 120 generates the stream end information shall be described later.

Then, the start clock calculating unit 112 calculates the multiplex starting system clock (S104). Specifically, the start clock calculating unit 112 uses the following equations introduced in the description of FIG. 1 in order to calculate the multiplex starting system clock:

$$STC\_delta = PTS1\_1\_end + Tpp - PTS2\_2\_start;$$

$$STC2\_1\_end = STC1\_1\_end - STC\_delta; \text{ and}$$

$$STC2\_2\_start > STC2\_1\_end$$

In other words, the start clock calculating unit 112 obtains the stream end information as the stream end information of the preceding stream. Here, the stream end information includes (i) the video end PTS (PTS1_1_end+Tpp) generated by the stream end information generating unit 120 according to a predetermined video end PTS, and (ii) the stream end system clock (STC1_1_end). In addition, the start clock calculating unit 112 obtains the video start PTS (PTS2_2_start) from the multiplexed pack generating unit 111. Then, the start clock calculating unit 112 uses obtained PTS1_1_end+Tpp, STC1_1_end, and PTS2_2_start to calculate the multiplex starting system clock (STC2_2_start).

Next, the end clock calculating unit 113 calculates the multiplex ending system clock (S106). Specifically, the end clock calculating unit 113 uses the following equations introduced in the description of FIG. 1 in order to calculate the multiplex ending system clock:

$STC\_delta = PTS1\_1\_end + Tpp - PTS2\_2\_start$; and $STC2\_1\_end = STC1\_1\_end - STC\_delta$ In other words, the end clock calculating unit 113 obtains, from the multiplexed pack generating unit 111, the video start PTS (PTS2_2_start) as the video start PTS of the following stream. The end clock calculating unit 113 obtains the stream end information including (i) the video end PTS (PTS1_1_end+Tpp) generated by the stream end information generating unit 120 according to the video end PTS obtained from the multiplexed pack generating unit 111, and (ii) the stream end system clock (STC1_1_end). Then, the end clock calculating unit 113 uses obtained PTS2_2_start, PTS1_1_end+Tpp, and STC1_1_end to calculate the multiplex ending system clock (STC2_1_end).

Next, the multiplexed pack generating unit 111 generates the multiplexed stream between (i) the start of the multiplexing at the multiplex starting system clock calculated by the start clock calculating unit 112 and (ii) the end of the multiplexing at the multiplex ending system clock calculated by the end clock calculating unit 113 (S108).

As described above, the principal feature of the moving picture multiplexing apparatus 100 according to Embodiment in the present invention is to (i) set an appropriate value for end information of a virtual preceding stream, and (ii) employ start information of a currently multiplexed stream as start information of a virtual following stream. Here, the virtual following stream is regarded as the currently multiplexed stream. The moving picture multiplexing apparatus 100 accomplishes the multiplexing so that the end and the start of the currently multiplexed stream can be seamlessly connected. This process makes possible generating a stream having identical conditions of the end of the virtual preceding stream.

When two or more streams are recorded, the process allows end information of virtual preceding streams to remain constant, so that: (i) all the recorded streams can be seamlessly connected to the corresponding virtual preceding streams, and (ii) the ends of all the recorded streams can share identical conditions with those of the virtual preceding streams. In other words, each of the recorded streams can be seamlessly connected to any other stream.

Detailed next is how the stream end information generating unit 120 generates the stream end information (S102 in FIG. 5) in order to set an appropriate value for the end information of a virtual preceding stream.

Figure 6:
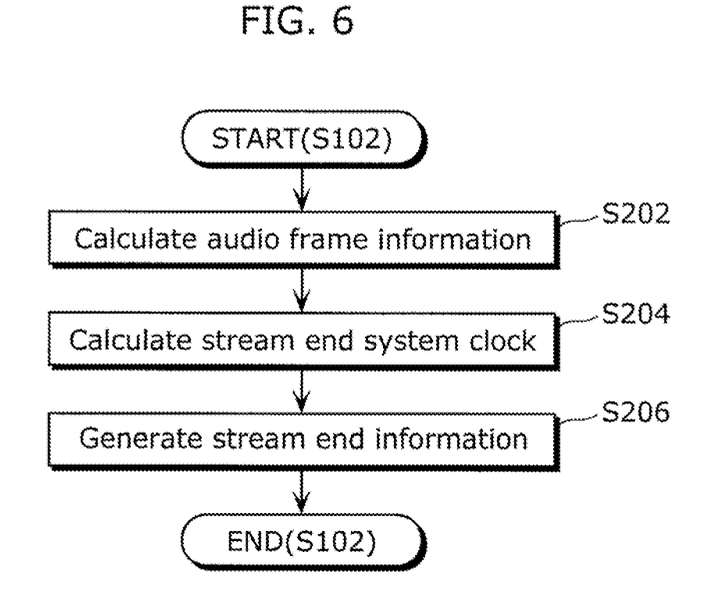
FIG. 6 is a flowchart showing a process of generating stream end information by the stream end information generating unit according to Embodiment in the present invention.

FIG. 6 is a flowchart showing a process of generating stream end information by the stream end information generating unit 120 according to Embodiment in the present invention.

As shown in FIG. 6, first, the audio frame information calculating unit 121 calculates the audio frame information (S202). Specifically, the audio frame information calculating unit 121 uses the audio coding parameter to calculate the audio frame information indicating a size and a time of audio data for one frame. The audio coding parameter includes the bit rate and the sampling frequency of the audio data.

More specifically, the audio frame information calculating unit 121 uses the audio coding parameter to calculate a value defined by an audio coding standard as the audio frame information. In other words, the value to be used as the size and the duration (time period) of audio data for one frame is defined by the audio coding standard according to the bit rate and the sampling frequency.

For example, the following is defined when the audio is coded by Dolby Digital (AC-3), the bit rate is 384,000 bps, and the sampling frequency is 48,000 Hz:

The size of the audio data for one frame (A_size)=1,536 byte; and

The duration of the audio data (A_time)=1536/48,000 sec.

Next, the stream end system clock calculating unit 122 calculates the stream end system clock (S204). Depending on the difference between the end PTS of the audio data and the end PTS of the video data, specifically, the stream end system clock calculating unit 122 changes the system clock at which the end data of the last packet in the multiplexed stream is transmitted to calculate the stream end system clock.

In the AVCHD standard, specifically, the end PTS of the audio data is behind that of the video data up to a time period for one frame of the audio data. The stream end system clock calculating unit 122 takes into consideration the time period for one frame of the audio data in order to calculate the stream end system clock.

More specifically, the stream end system clock calculating unit 122 calculates the stream end system clock according to the procedure below, using the video end PTS (PTS1_1_end+Tpp=V_end), the audio frame information (A_size, A_time) calculated by the audio frame information calculating unit 121, and the audio virtual buffer model parameter.

Here, a value defined by the audio and visual standard is used as each parameter included in the audio virtual buffer model parameter. For example, when Dolby Digital (AC-3) is employed for audio coding in the AVCHD standard, each parameter included in the audio virtual buffer model parameter is determined as follows:

The Packet size (P_size)=188 byte;
The transport buffer size (TB4_size)=512 byte;
The elementary buffer size (B4_size)=18,640 byte; and
The leak rate (R×4)=2×10^6 bit/sec The stream end system clock calculating unit 122 uses the value of each parameter to calculate the stream end system clock (STC_end) according to the following equations:

$STC\_end = V\_end - \{B4\_size * (A\_time - P\_size/R \times 4)/A\_size\}$

Here, the packet size is a size of the audio data packet. The elementary buffer size is a size of an elementary buffer for the audio data. The leak rate is a leak rate of the elementary buffer of the audio data. STC_end; namely the stream end system clock, is STC1_1_end when representing the stream end system clock of the preceding stream.

Next, the stream end information generating unit 120 generates the stream end information including (i) the stream end system clock calculated by the stream end system clock calculating unit 122, and (ii) the video end PTS (S206).

Here, the stream end information of the virtual preceding stream is obtained when the stream end information generating unit 120 receives the following: an appropriate value (10 seconds, for example) defined by the user as the video end PTS, an audio coding parameter determined by the characteristics of the audio and video recording apparatus 10 and an audio virtual buffer model parameter obtained based on audio coding information defined by an audio and video standard.

The audio and video recording apparatus 10 according to Embodiment in the present invention is featured to stop the stream end system clock employing the video end PTS and a certain condition. The stream end system clock at the end of the recording is determined by the stream end information generating unit 120. Regarded as a target value to end the recording, the stream end information is obtained through the following processes: (i) setting a video PTS for ending the recording at the video end PTS, and (ii) providing to the stream end information generating unit 120 the recorded audio coding parameter and the audio virtual buffer model parameter obtained based on the audio coding information.

Figure 7:
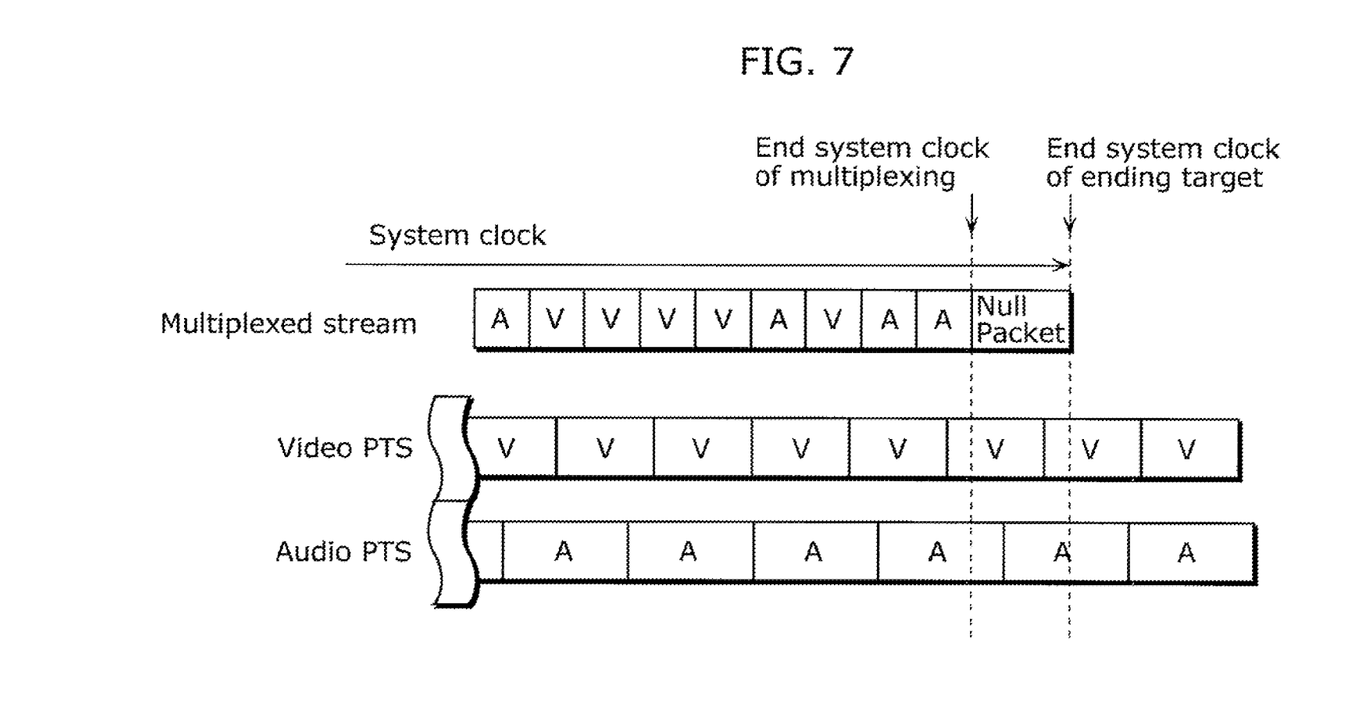
FIG. 7 shows how an end system clock is adjusted when the multiplexing according to Embodiment in the present invention is accomplished.

Then, as shown in FIG. 7, the moving picture multiplexing apparatus 100 is featured to insert a Null packet (a padding packet with no elementary data) between (i) the end (the end system clock of the multiplexing shown in FIG. 7) of the multiplexed stream and (ii) the target stream end system clock (an end system clock of an ending target as shown in FIG. 7) in order to adjust the end system clock when the multiplexing is accomplished, so that the stream file ends at the stream end system clock of the obtained stream end information. FIG. 7 shows how the end system clock is adjusted when the multiplexing according to Embodiment in the present invention is accomplished.

Two or more multiplexed streams generated above can satisfy the conditions for the seamless connection with the reproduction order thereof is changed. Thus, the moving picture multiplexing apparatus 100 eliminates the need for re-multiplexing even though the reproduction order of the multiplexed streams is changed. This feature contributes to a shorter processing time.

Then, the stream end information generating unit 120 ends the process for generating the stream end information (FIG. 5 S102).

As described above, the multiplexed stream is generated by the moving picture multiplexing apparatus 100 according to Embodiment in the present invention through the following operations: (i) the multiplex starting system clock is calculated with the stream end information as that of the preceding stream; (ii) the multiplex ending system clock is calculated with the video start PTS as the video start PTS in the following stream; and (iii) the stream is multiplexed between the start of the multiplexing at the multiplex starting system clock and the end of the multiplexing at the multiplex ending system clock. In other words, the moving picture multiplexing apparatus 100 can generate a multiplexed stream seamlessly-connectible to a virtually set preceding stream, as well as to a virtually set following stream. The moving picture multiplexing apparatus 100 generates multiplexed streams so that all the multiplexed streams are seamlessly connectible to virtually set preceding streams and virtually set following streams. Accordingly, all such multiplexed streams can be seamlessly reproduced in any reproducing order. Hence, the moving picture multiplexing apparatus 100 can generate seamlessly reproducible multiplexed streams when reproducing the multiplexed streams in an order different from the recording order.

Furthermore, the start clock calculating unit 112 calculates a multiplex starting system clock, employing stream end information generated out of a video end PTS predetermined by the user and a video start PTS obtained from the multiplexed pack generating unit 111. This operation makes possible easily obtaining the stream end information and the video start PTS to calculate the multiplex starting system clock.

Moreover, the end clock calculating unit 113 uses (i) the stream end information generated out of the video end PTS obtained from the multiplexed pack generating unit 111 and (ii) the video start PTS to calculate a multiplex ending system clock. This operation makes possible easily obtaining the stream end information and the video start PTS to calculate the multiplex ending system clock.

Taking the difference between the end PTSs of the audio data and the video data into consideration, the stream end information generating unit 120 calculates the stream end system clock to generate the stream end information. According to the AVCCD standard, for example, the end PTS of the audio data is behind that of the video data up to a time period for one frame of the audio data. Taking the time period of the audio data for one frame into consideration, the stream end information generating unit 120 the stream end system clock to generate a seamlessly reproducible multiplexed stream.

In addition, stream end information generating unit 120 uses an audio coding parameter to calculate audio frame information, and uses the audio frame information, the video end PTS, and an audio virtual buffer model parameter to calculate the stream end system clock. Here, the audio coding parameter is a value determined by the characteristics of the audio and video recording apparatus 10 The video end PTS is a value predetermined by the user. The audio virtual buffer model parameter is a value determined by a standard. Thus, the stream end system clock can be easily calculated with those values.

The moving picture multiplexing apparatus 100 multiplexes AVCHD-compliant audio data and video data to generate a multiplexed stream. In other words, the moving picture multiplexing apparatus 100 can generate a seamlessly-reproducible multiplexed stream in the AVCHD standard.

Instead of being introduced as the moving picture multiplexing apparatus 100, the present invention is presented as the audio and video recording apparatus 10 including the moving picture multiplexing apparatus 100, and storing a multiplexed stream generated by the moving picture multiplexing apparatus 100. The present invention can be provided as a moving picture multiplexing method which employs processes of the units included in the moving picture multiplexing apparatus 100 as steps. Furthermore, the present invention can be introduced as (i) a program to cause a computer to execute those steps, (ii) a computer-readable storage medium such as a CD-ROM, and (iii) information, data, and a signal indicating the program. Then, the program, the information, the data, and the signal may be distributed via a communications network, such as the Internet.

The present invention may also be provided as a Large Scale Integrated circuit (LSI); that is, an integrated circuit including the units forming the moving picture multiplexing apparatus 100 and the audio and video recording apparatus 10. Each of the units may be formed in a single chip. Some or all of the units are formed in a single chip. Specifically, for example, each functional block included in the moving picture multiplexing apparatus 100 shown in FIG. 3 may be formed in a single chip. Each functional block included in the moving picture coding apparatus 11 may be formed in a single chip.

Here, it is noted that the LSI is exemplified as an integrated circuit; concurrently, the integrated circuit may be referred to as the Integrated Circuit (IC), the system LSI, the super LSI, and the ultra LSI, depending on its integration density. Moreover, the integrated circuit shall not be limited to the LSI; instead, the integrated circuit may be a designated circuit or a general-purpose processor. In addition, the following may be employed: the Field Programmable Gate Array (FPGA) which is programmable after building the LSI, and the reconfigurable processor which allows a circuit cell in the LSI to be reconnected and reconfigured. In the case where the advancement of the semiconductor technology or another derivative technology thereof introduces and a new circuit integrating technique which will replace the LSI, the new technology may be employed as a matter of course to integrate the functional blocks. The biotechnology can be applied to the integration.

Figure 8:
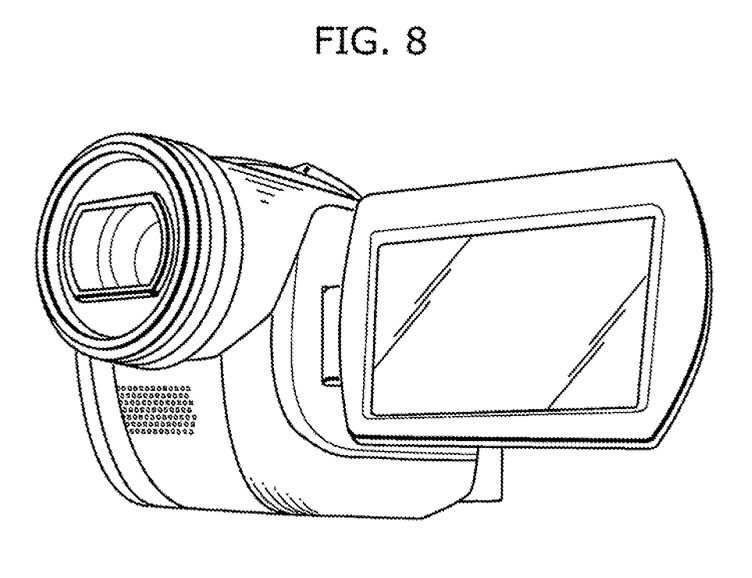
FIG. 8 shows an outline drawing of a camcorder equipped with the audio and video recording apparatus according to Embodiment in the present invention.

Here, for example, the audio and video recording apparatus 10, having the moving picture multiplexing apparatus 100 according to the present invention, is included in an imaging device, such as an AVCHD-compliant camcorder shown in FIG. 8. Hence, the moving picture multiplexing apparatus 100 according to the present invention contributes to the introduction of a camcorder which generates seamlessly-reproducible multiplexed streams when reproducing the multiplexed streams in an order different from the recording order.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

A moving picture multiplexing apparatus according to the present invention can be used for (i) a device generating a multiplexed stream of audio and video data that complies with an audio and video standard defining seamless reproduction, and (ii) a device storing the multiplexed stream.

What is claimed is:

1. A moving picture multiplexing apparatus which multiplexes coded audio data and coded video data to generate a multiplexed stream seamlessly reproducible with a preceding stream and a following stream, said moving picture multiplexing apparatus comprising:
a stream end information generating unit configured to generate stream end information including a stream end system clock, using a video end Presentation Time Stamp (PTS) which is a PTS assigned to an end of the video data, the stream end system clock indicating a time at which end data of a last packet in the multiplexed stream is transmitted;
a start clock calculating unit configured to calculate a multiplex starting system clock indicating a time at which multiplexing starts, using (i) as stream end information on the preceding stream, the stream end information generated by said stream end information generating unit and (ii) a video start PTS which is a PTS assigned to a start of the video data;
an end clock calculating unit configured to calculate a multiplex ending system clock indicating a time at which the multiplexing ends, using (i) as a video start PTS of the following stream, the video start PTS, and (ii) the stream end information generated by said stream end information generating unit; and
a multiplexed pack generating unit configured to generate the multiplexed stream by (i) starting the multiplexing at the multiplex starting system clock calculated by said start clock calculating unit, and (ii) ending the multiplexing at the multiplex ending system clock calculated by said end clock calculating unit,
wherein, depending on a difference between a PTS assigned to an end of the audio data and the PTS assigned to the end of the video data, said stream end information generating unit is configured to (i) change a system clock at which the end data of the last packet in the multiplexed stream is transmitted so as to calculate the stream end system clock, and (ii) generate the stream end information including the calculated stream end system clock and the video end PTS, and wherein said stream end information generating unit further includes:
an audio frame information calculating unit configured to calculate audio frame information including a size and a time period of audio data for one frame, using an audio coding parameter including a bit rate and sampling frequency of the audio data; and
a stream end system clock calculating unit configured to calculate the stream end system clock, using the calculated audio frame information, the video end PTS, and an audio virtual buffer model parameter including a packet size, a buffer size, and a leak rate of the audio data.

2. The moving picture multiplexing apparatus according to claim 1, wherein said start clock calculating unit is configured to calculate the multiplex starting system clock, using the stream end information generated by said stream end information generating unit and the video start PTS obtained from said multiplexed pack generating unit, the stream end information being generated according to the video end PTS which has been predetermined.

3. The moving picture multiplexing apparatus according to claim 1, wherein said end clock calculating unit is configured to calculate the multiplex ending system clock, using the stream end information generated by said stream end information generating unit and the video start PTS, the stream end information being generated according to the video end PTS obtained from said multiplexed pack generating unit.

4. The moving picture multiplexing apparatus according to claim 1 which multiplexes the video data and the audio data to generate the multiplexed stream, the video data and the audio data being Advanced Video Codec High Definition (AVCHD)-compliant.

5. An audio and video recording apparatus which includes the moving picture multiplexing apparatus according to claim 1 and records the multiplexed stream generated by the moving picture multiplexing apparatus.

6. A moving picture multiplexing method for multiplexing coded audio data and coded video data to generate a multiplexed stream seamlessly reproducible with a preceding stream and a following stream, said moving picture multiplexing method comprising:
generating stream end information including a stream end system clock, using a video end Presentation Time Stamp (PTS) which is a PTS assigned to an end of the video data, the stream end system clock indicating a time at which end data of a last packet in the multiplexed stream is transmitted;
calculating a multiplex starting system clock indicating a time at which multiplexing starts, using (i) as stream end information on the preceding stream, the stream end information generated in said generating of the stream end information, and (ii) a video start PTS which is a PTS assigned to a start of the video data;
calculating a multiplex ending system clock indicating a time at which the multiplexing ends, using (i) as a video start PTS of the following stream, the video start PTS and (ii) the stream end information generated in said generating of the stream end information; and
generating the multiplexed stream by (i) starting the multiplexing at the multiplex starting system clock calculated in said calculating the multiplex starting system clock, and (ii) ending the multiplexing at the multiplex ending system clock calculated in said calculating of the multiplex ending system clock,
wherein, depending on a difference between a PTS assigned to an end of the audio data and the PTS assigned to the end of the video data, said generating stream end information further includes (i) change a system clock at which the end data of the last packet in the multiplexed stream is transmitted so as to calculate the stream end system clock, and (ii) generate the stream end information including the calculated stream end system clock and the video end PTS, and wherein said generating of the stream end information further includes:

calculating audio frame information including a size and a time period of audio data for one frame, using an audio coding parameter including a bit rate and sampling frequency of the audio data; and calculating the stream end system clock, using the calculated audio frame information, the video end PTS, and an audio virtual buffer model parameter including a packet size, a buffer size, and a leak rate of the audio data.

7. A program stored on a non-transitory computer-readable recording medium for multiplexing coded video data and coded audio data to generate a multiplexed stream in which a preceding stream and a following stream are seamlessly reproducible, the program causing a computer to execute steps included in the moving image multiplexing method according to claim 6.

8. An integrated circuit which multiplexes coded audio data and coded video data to generate a multiplexed stream seamlessly reproducible with a preceding stream and a following stream, said integrated circuit comprising:

a stream end information generating unit configured to generate stream end information including a stream end system clock, using a video end Presentation Time Stamp (PTS) which is a PTS assigned to an end of the video data, the stream end system clock indicating a time at which end data of a last packet in the multiplexed stream is transmitted;

a start clock calculating unit configured to calculate a multiplex starting system clock indicating a time at which multiplexing starts, using (i) as stream end information on the preceding stream, the stream end information generated by said stream end information generating unit, and (ii) a video start PTS which is a PTS assigned to a start of the video data;

an end clock calculating unit configured to calculate a multiplex ending system clock indicating a time at which the multiplexing ends, using (i) as a video start PTS of the following stream, the video start PTS and (ii) the stream end information generated by said stream end information generating unit; and a multiplexed pack generating unit configured to generate the multiplexed stream by (i) starting the multiplexing at the multiplex starting system clock calculated by said start clock calculating unit, and (ii) ending the multiplexing at the multiplex ending system clock calculated by said end clock calculating unit, wherein, depending on a difference between a PTS assigned to an end of the audio data and the PTS assigned to the end of the video data, said stream end information generating unit is configured to (i) change a system clock at which the end data of the last packet in the multiplexed stream is transmitted so as to calculate the stream end system clock, and (ii) generate the stream end information including the calculated stream end system clock and the video end PTS, and wherein said stream end information generating unit further includes:

an audio frame information calculating unit configured to calculate audio frame information including a size and a time period of audio data for one frame, using an audio coding parameter including a bit rate and sampling frequency of the audio data; and a stream end system clock calculating unit configured to calculate the stream end system clock, using the calculated audio frame information, the video end PTS, and an audio virtual buffer model parameter including a packet size, a buffer size, and a leak rate of the audio data.

* * * * *